United States Patent
Yamahara

(10) Patent No.: US 10,152,215 B2
(45) Date of Patent: Dec. 11, 2018

(54) SETTING ADJUSTMENT RANGE OF GRAPHICAL USER INTERFACE

(71) Applicant: Rakuten, Inc., Tokyo (JP)

(72) Inventor: Hisanori Yamahara, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 192 days.

(21) Appl. No.: 15/037,203

(22) PCT Filed: Dec. 27, 2013

(86) PCT No.: PCT/JP2013/085103
§ 371 (c)(1),
(2) Date: May 17, 2016

(87) PCT Pub. No.: WO2015/097860
PCT Pub. Date: Jul. 2, 2015

(65) Prior Publication Data
US 2016/0299674 A1    Oct. 13, 2016

(51) Int. Cl.
*G06F 3/0484* (2013.01)
*G06F 3/0485* (2013.01)

(52) U.S. Cl.
CPC ........ *G06F 3/04847* (2013.01); *G06F 3/0484* (2013.01); *G06F 3/0485* (2013.01); *G06F 3/04855* (2013.01)

(58) Field of Classification Search
CPC . G06F 3/00; G06F 3/041; G06F 3/048; G06F 3/0482; G06F 3/0484; G06F 3/04845; G06F 3/04847; G06F 3/0488
See application file for complete search history.

(56) References Cited

U.S. PATENT DOCUMENTS

| | | | | |
|---|---|---|---|---|
| 9,836,204 | B1* | 12/2017 | Huang | G06F 3/04855 |
| 2002/0012526 | A1* | 1/2002 | Sai | G11B 19/022 386/241 |
| 2009/0172703 | A1* | 7/2009 | Nakano | G06F 11/3476 719/318 |
| 2009/0282362 | A1 | 11/2009 | Matsumoto | |
| 2010/0039400 | A1* | 2/2010 | Jang | G06F 3/0485 345/173 |

(Continued)

FOREIGN PATENT DOCUMENTS

| | | | |
|---|---|---|---|
| JP | 2006-164033 A | 6/2006 | |
| JP | 2008-033743 A | 2/2008 | |

(Continued)

OTHER PUBLICATIONS

JP 2013-161171 Machine Translation.*
JP 2013-214192 Machine Translation.*

*Primary Examiner* — Xiomar L Bautista
(74) *Attorney, Agent, or Firm* — Sughrue Mion, PLLC

(57) ABSTRACT

An information processing device according to one embodiment includes a setting unit and a control unit. The setting unit sets, based on user operation positions in a graphical user interface that outputs information on a basis of a value specified by a user operation, an adjustment range being a part of a slidable range in the graphical user interface. The control unit controls the graphical user interface so that a pace of change in the value in the adjustment range is lower than a pace of change in the value in a no adjustment range different from the adjustment range.

9 Claims, 18 Drawing Sheets

(56) References Cited

U.S. PATENT DOCUMENTS

| | | | | |
|---|---|---|---|---|
| 2010/0185984 A1* | 7/2010 | Wright | ............... | G06T 11/206 715/833 |
| 2010/0306694 A1* | 12/2010 | Conzola | ............. | G06F 3/04847 715/786 |
| 2011/0246943 A1* | 10/2011 | Fujibayashi | ........ | G06F 3/04847 715/833 |
| 2012/0030634 A1* | 2/2012 | Miyazaki | ............ | G06F 3/04847 715/863 |
| 2013/0093709 A1* | 4/2013 | Fujibayashi | ........ | G06F 3/04847 345/173 |
| 2013/0191747 A1* | 7/2013 | Choi | ...................... | G06F 3/048 715/716 |
| 2014/0052746 A1* | 2/2014 | Kim | .................... | G06F 3/0485 707/758 |

FOREIGN PATENT DOCUMENTS

| | | |
|---|---|---|
| JP | 2008-152333 A | 7/2008 |
| JP | 2009-295147 A | 12/2009 |
| JP | 2010-239210 A | 10/2010 |
| JP | 2013-149246 A | 8/2013 |
| JP | 2013-161171 A | 8/2013 |
| JP | 2013-214192 A | 10/2013 |

* cited by examiner

SETTING ADJUSTMENT RANGE OF GRAPHICAL USER INTERFACE

CROSS REFERENCE TO RELATED APPLICATIONS

This application is a National Stage of International Application No. PCT/JP2013/085103 filed Dec. 27, 2013, the contents of which are incorporated herein by reference in its entirety.

TECHNICAL FIELD

One aspect of the present invention relates to an information processing device, an information processing method, and an information processing program for controlling a graphical user interface for sliding a value.

BACKGROUND ART

As one of graphical user interfaces (GUI) of computers, a. component that changes a value by a sliding operation such as a seekbar is known. For example, the information processing device that controls a seekbar for specifying a video playback position is disclosed in Patent Literature 1 below. This information processing device includes a display control means that displays a seekbar for controlling a playback position where a decoding means decodes video data and displays an image extracted by an image extraction means at a position above the seekbar which is determined based on timestamp information.

CITATION LIST

Patent Literature

PTL 1: JP 2010-239210 A

SUMMARY OF INVENTION

Technical Problem

However, in the GUI according to related art as disclosed in the above Patent Literature 1, it is difficult to specify a detailed position while it is easy to specify a rough position by a sliding operation. Therefore, it is not easy for a user to specify a desired controllable value or makes fine adjustment of that value by using the GUI. It is therefore desirable to more easily specify a value in a graphical user interface with a sliding operation.

Solution to Problem

An information processing device according to one aspect of the present invention includes a setting unit configured to, based on user operation positions in a graphical user interface that outputs information on a basis of a value specified by a user operation, set an adjustment range being a part of a slidable range in the graphical user interface, and a control unit configured to control the graphical user interface so that a pace of change in the value in the adjustment range is lower than a pace of change in the value in a no adjustment range different from the adjustment range.

An information processing method according to one aspect of the present invention includes a setting step, by an information processing device, of, based on user operation positions in a graphical user interface that outputs information on a basis of a value specified by a user operation, setting an adjustment range being a part of a slidable range in the graphical user interface, and a control step, by the information processing device, of controlling the graphical user interface so that a pace of change in the value in the adjustment range is lower than a pace of change in the value in a no adjustment range different from the adjustment range.

An information processing program according to one aspect of the present invention causes a computer to function as a setting unit configured to, based on user operation positions in a graphical user interface that outputs information on a basis of a value specified by a user operation, set an adjustment range being a part of a slidable range in the graphical user interface, and a control unit configured to control the graphical user interface so that a pace of change in the value in the adjustment range is lower than a pace of change in the value in a no adjustment range different from the adjustment range.

According to the above aspects, the pace of change in value in the adjustment range that is set based on, operation positions in the graphical user interface is lower than the pace of change in value in the no adjustment range. Because the value changes more slowly than usual in the adjustment range, a user can easily find a desired value in the adjustment range.

In an information processing program according to another aspect, the setting unit may set the adjustment range based on a first operation position and a second operation position specified after the first operation position among a plurality of operation positions.

In an information processing program according to another aspect, the setting unit may set the adjustment range whose boundaries are the first operation position and an end of the slidable range and including the second operation position.

In an information processing program according to another aspect, the setting unit may set the adjustment range whose boundaries are the first operation position and the second operation position.

In an information processing program according to other aspect, when, after the second operation position, a third operation position is specified in a region between the first operation position and the second operation position, the setting unit may set the adjustment range whose boundaries are the first operation position and the second operation position.

in an information processing program according to another aspect, when, after a knob automatically moves from the second operation position to the first operation position, a third operation position is specified in a region between a position of the knob after movement and the first operation position, the setting unit may set the adjustment range whose boundaries are the position of the knob after movement and the first operation position.

In an information processing program according to another aspect, the setting unit may set the adjustment range whose boundaries are at least two operation positions located outermost among the plurality of operation positions.

In an information processing program according to another aspect, the control unit may control the graphical user interface by setting a moving speed of a knob in the adjustment range to be lower than a moving speed of the knob in the no adjustment range.

In an information processing program according to another aspect, the control unit may control the graphical user interface by displaying the adjustment range in an enlarged scale along a sliding direction of the knob.

In an information processing program according to another aspect, the control unit may set a pace of change in the value in the adjustment range to be the same as a pace of change in the value in the no adjustment range in accordance with a specified event.

Advantageous Effects of Invention

According to one aspect of the present invention, it is possible to more easily specify a value in a graphical user interface with a sliding operation.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

First, the functions and configuration of an information processing device 10 according to this embodiment are described. The information processing device 10 is a computer that provides a user with functions of a graphical user interface (GUI). The type of the information processing device 10 is not particularly limited. For example, the information processing device 10 may be a large scale computer that is used as a server or a stationary or portable personal computer (PC). Alternatively, the information processing device 10 may be a mobile terminal such as an advanced mobile phone (smart phone), a cellular phone or a personal digital assistant (PDA). Alternatively, the information processing device 10 may be given electric home appliances that provide GUI.

Figure 1:
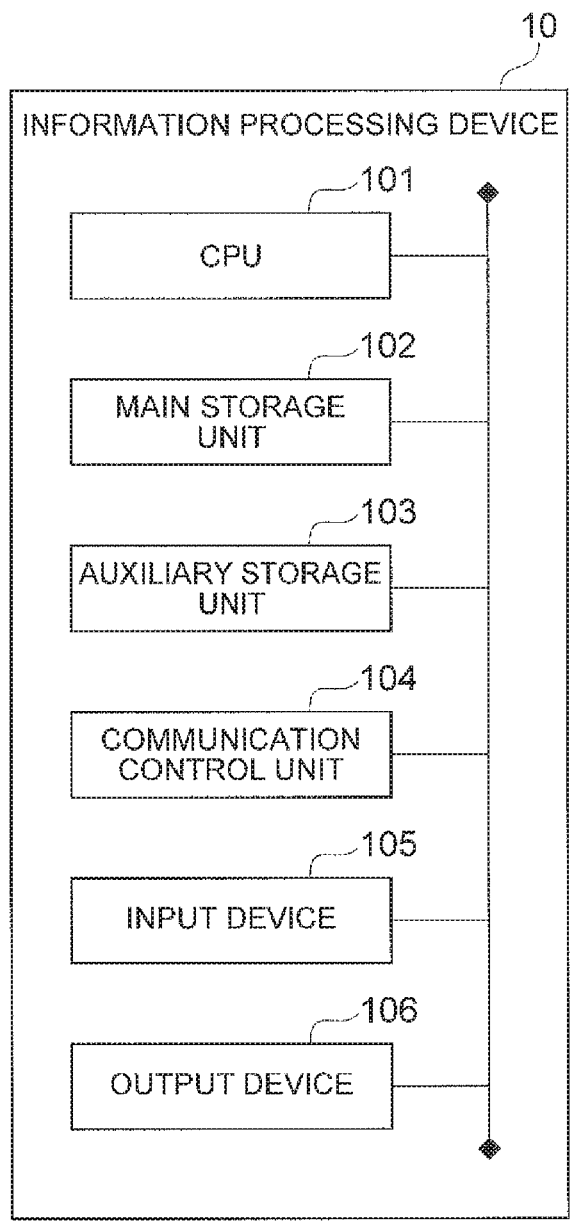
FIG. 1 is a view showing a hardware configuration of an information processing device according to an embodiment.

FIG. 1 shows a typical hardware configuration of the information processing device 10. The information processing device 10 includes a CPU 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display or a printer. As a matter of course, hardware modules mounted thereon vary by the type of the information processing device 10. For example, while a stationary PC often includes a keyboard, a mouse and a monitor as the input device and the output device, a smartphone often has a touch panel that functions as the input device and the output device.

The functional elements of the information processing device 10, which are described later, are implemented by loading given software onto the CPU 101 or the main storage unit 102, making the communication control unit 104, the input-device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

The information processing device 10 may be a set of a plurality of computers or electronic equipment that are connected with one another through a communication network. In this case, the functional elements of the information processing device 10 are implemented by distribution processing.

The information processing device 10 according to this embodiment is characterized in the way of controlling GUI that outputs information based on a value specified by a user operation (for example, a sliding operation). Examples of such GUI include a seekbar, a scrollbar and a color picker. The seekbar and the scrollbar are GUI that changes a value on one-dimensional coordinates (which is, x-axis). On the other hand, the color picker that controls RGB values is GUI that changes a value on three one-dimensional coordinates respectively corresponding to R, G and B, or on a two-dimensional coordinates (which is, xy plane) where colors are arranged on the plane. As a matter of course, the type of GUI with a sliding operation is not limited to the above examples. Those GUI generally have a component called knob (which is also referred to as "slider", "bar" and the like), and a user can change a value by moving the knob. Note that, however, the present invention is applicable also to GUI without knob.

"Sliding operation" in this specification means an operation that directly or indirectly changes the current value. When GUI has a knob, the sliding operation also means an operation that directly or indirectly changes the knob at the position corresponding to the current value in order to change that value. For example, the operation of dragging a knob is one type of sliding operation. Further, the operation that clicks or taps on a position different from the current position of a knob in a track for moving the knob to thereby move the knob to that new position is also one type of sliding operation. Alternatively, clicking on an arrow of a scrollbar to move a knob by a certain unit of distance (for example, the length of the knob) each time is also one type of sliding operation. Alternatively, pressing a fast-forward button or a fast-rewind button of a seekbar and thereby changing a playback start time is also one type of sliding operation. In this specification, the range where a knob can move on GUI or the range where a value changes on GUI is referred to as "slidable range".

"Value" in this specification means a given attribute value that changes in response to a sliding operation in GUI. The GUI displays this value at an arbitrary position. When a sliding operation is done in the GUI, the value continuously changes by the sliding operation. For example, the value that can be changed by a seekbar for specifying a playback start time of a video is the playback start time, and when a sliding operation is done in the seekbar, the playback start time changes at specified intervals (for example, at intervals of 1 second, 30 seconds, 60 seconds etc.). In the case where the GUI is a scrollbar for scrolling a screen, the value that can be changed is a coordinate or a page indicating a display position, and when a sliding operation is done in the scrollbar, the display page changes one by one or the corresponding coordinates change at specified intervals (for example, one by one). In the case where the GUT is a color picker, the value that can be changed is RGB values, and when a sliding operation is done in the color picker, at least one of three elements of RGB values changes at specified intervals (for example, one by one). Note that the type of the value is not limited to those.

"Information based on the value specified by a user operation" means information set based on the value, information corresponding to the value, or the value itself. For example, when the value is the playback start time "30 minutes and 45 seconds", the information based on the value may be music that is played back from the playback start time "30 minutes and 45 seconds". Alternatively, information indicating the playback start time, which is the character string "30:45", can be also the information based on the value "30 minutes and 45 seconds".

Figure 2:
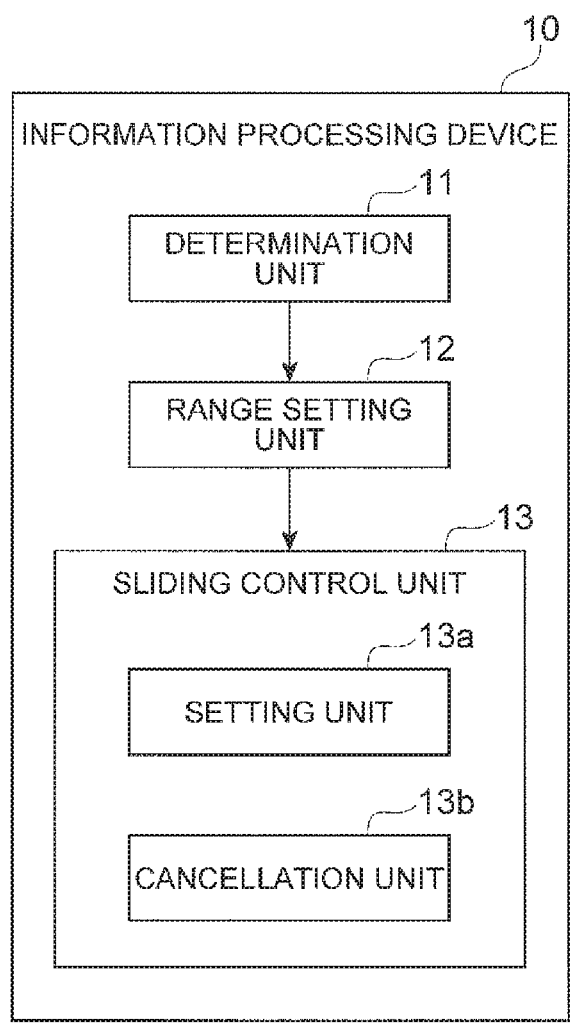
FIG. 2 is a block diagram showing a functional configuration of the information processing device according to the embodiment.

When the information processing device 10 determines that a user is confused about the setting of a value in the GUI that accepts a sliding operation, it controls the sliding operation to facilitate the setting. To implement this processing, the information processing device 10 includes, as functional elements, a determination unit 11, a range setting unit 12, and a sliding control unit 13. Those elements shown in FIG. 2 are implemented by the operation of at least one processor (CPU 101) or the like.

Figure 3:
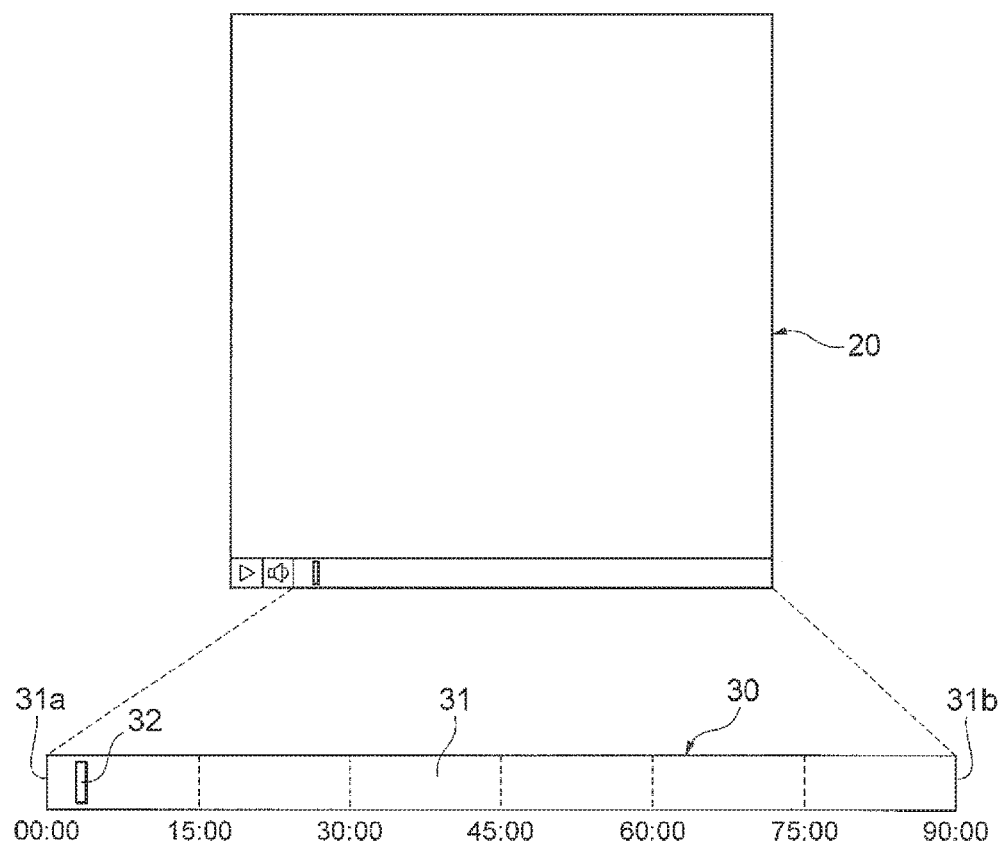
FIG. 3 is a view showing a seekbar, which is one example of GUI.

Hereinafter, for easier understanding of the invention, a seekbar 30 of a video playback application 20 shown in FIG. 3 is described as an example of the GUI. The seekbar 30 has a track 31 that is a bar- or strip-shaped operation region, and a knob 32 that can move between both ends 31a and 31b of the track 31. FIG. 3 shows the state where a video file of 90 minutes is read into a video playback application. In the example of FIG. 3, a user can select the playback start time from 0 minutes and 0 seconds (00:00) to 90 minutes and 0 second (90:00) by operating the knob 32. The playback start time is a value that changes in accordance with a user operation in the seekbar 30. The seekbar 30 displays the playback start time specified by the user operation at an arbitrary position. For example, the seekbar 30 displays the playback start time in a region adjacent to the track 31 or displays the playback start time above the knob 32 while the knob 32 is being operated.

Because the playback time "90 minutes" corresponds to the length of the track 31, a user can roughly specify the playback start time by operating the knob 32. For example, a user can move the knob 32 to about the middle of the track 31 and thereby play back the video from about 45 minutes, or can move the knob 32 by about two-thirds of the length of the track 31 from the end 31a to the end 31b and thereby play back the video from about 60 minutes. However, because the length of the track 31 is limited, it is difficult for a user to specify the playback start time in detail. In view of such a background, the information processing device 10 controls the sliding operation so that the setting of a value becomes easier.

Referring back to FIG. 2, the determination unit 11 is a functional element that determines a user operation position in GUI. The GUI provides various data such as an event indicating the start or the end of an operation and a parameter indicating the position of the knob. The determination unit 11 acquires the data and thereby determines the position of the knob in the GUI and the order where that position is specified.

The determination unit 11 determines, from the movement of the knob by one or a plurality of user operations, the position of the knob as the operation position. The one operation is the operation that is performed during the period from when the user selects the knob as an operation target to when the user deselects the knob. For example, the operation that the user keeps moving the knob in one direction or repeatedly moves it back and forth by a drag operation is one operation. Further, the operation that clicks on a position different from the current position of the knob on the track in order to move the knob to the different position is also one operation.

In the case where the knob passes through a plurality of positions during one operation such as a drag operation, the determination unit 11 may determine a plurality of operation positions from the one operation only. For example, the determination unit 11 may determine the position of the knob at the start of the one operation, the position where the moving direction of the knob changes during the operation and the position of the knob at the end of the operation as the operation positions. Alternatively, the determination unit 11 may determine only the start point and the end point of the final sliding operation in one direction as the operation positions.

Figure 4:
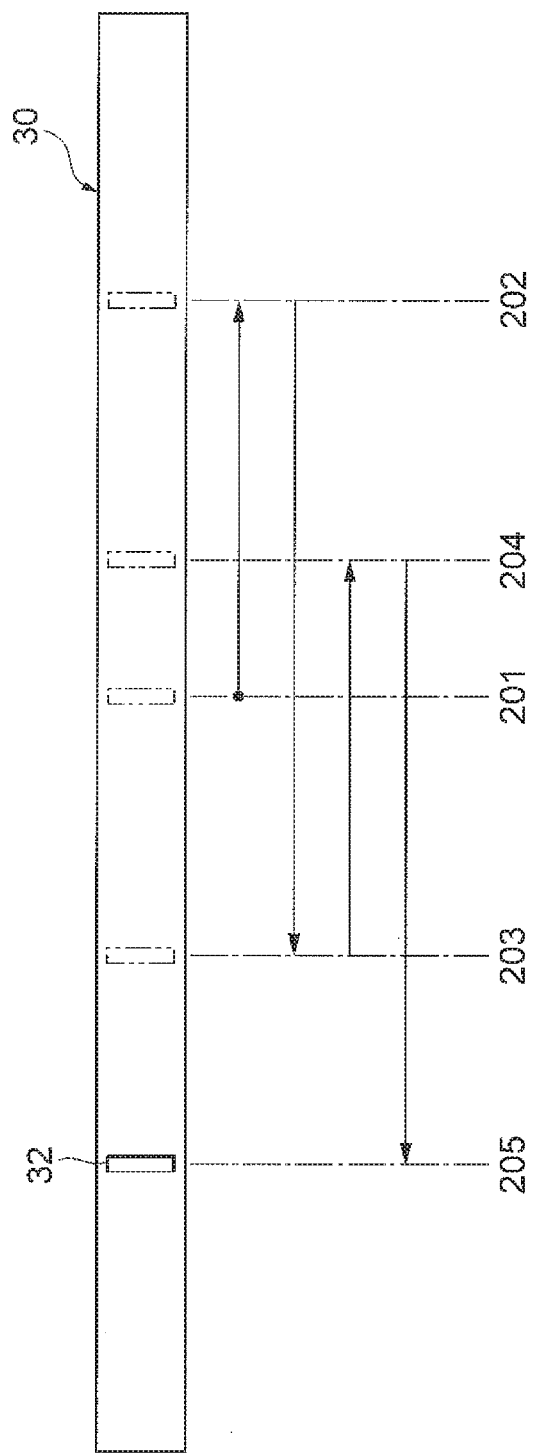
FIG. 4 is a view showing one example related to movement of a knob of a seekbar.

The processing of determining a user operation position from one operation is specifically described with reference to the example of FIG. 4. FIG. 4 shows an example in which the knob 32 of the seekbar 30 which is at a position 201 before the start of sliding operation is continuously slid through positions 202, 203, 204 and 205 in this order. In this case, the determination unit 11 determines that the operation positions 201 to 205 are specified in this order.

In the case where one operation ends instantly such as click and tap, the determination unit 11 determines the position where the operation is performed as the operation position. When a user clicks or taps a plurality of times, the determination unit 11 determines a plurality of operation positions.

Figure 5:
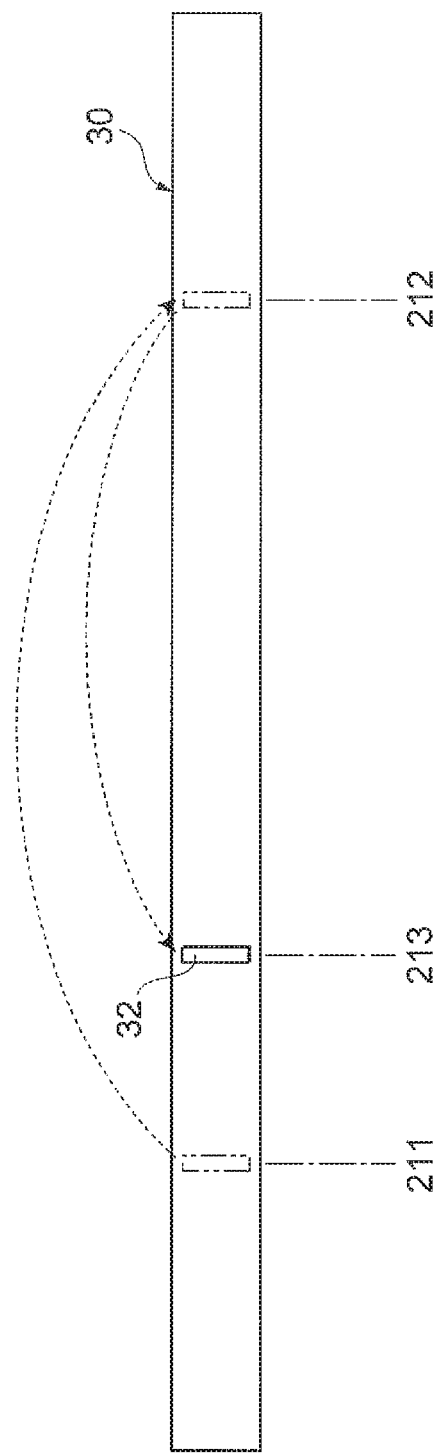
FIG. 5 is a view showing another example related to movement of a knob of a seekbar.

The processing of determining user operation positions from a plurality of operations is specifically described with reference to the example of FIG. 5. FIG. S shows an example in which a position 211 is specified by the first operation, a position 212 is specified by the second operation, and a position 213 is specified by the third operation. In this case, the knob 32 of the seekbar 30 moves instantaneously from the position 211 to the position 212, and then moves instantaneously from the position 212 to the position 213. In this example, the determination unit 11 determines that the positions 211 to 213 are specified in this order.

Although there various ways of acquiring operation positions as described above, the determination unit 11 acquires a plurality of operation positions in any way. Based on the assumption that the plurality of operation positions are obtained possibly because a user is confused about the setting of a value in the GUI, the determination unit 11 determines the plurality of operation positions.

The determination unit 11 generates data (operation position data) indicating the plurality of determined operation positions and outputs the operation position data to the range setting unit 12. In the example of FIG. 4, the determination unit 11 outputs the operation position data indicating that the operation positions 201 to 205 are specified in this order. In the example of FIG. 5, the determination unit 11 outputs the operation position data indicating that the operation positions 211 to 213 are specified in this order.

In the case of generating the operation position data from one operation only, the determination unit 11 may output the operation position data before the end of the one operation (for example, at the time when the knob moves back and fourth a plurality of times or more or when one operation continues for a specified time or longer) or may output the operation position data at the end of the one operation (at the time when the knob becomes no longer the operation target). In the case where the determination unit 11 outputs the operation position data in the middle of the operation, the control of the sliding operation (the processing of the range setting unit 12 and the sliding control unit 13 described later) can be carried out during that operation. In any way, the operation position data contains at least two operation positions.

The range setting unit 12 is a functional element that sets an adjustment range in GUI. The adjustment range is a region where the pace of change in value (the rate of change in value per unit time) in the GUI is lower than the pace of change in value in the other range. The adjustment range is a part of the slidable range of the GUI. At the activation of the GUI, the pace of change in value is the same in the entire slidable range, and this pace is also referred to as a normal value in this specification. When the adjustment range is set, the slidable range in the GUI is divided into the adjustment range and the other range (no adjustment range). In the adjustment range, the pace of change in value is lower than the normal value, and in the no adjustment range, the pace of change in value is set to or maintained at the normal value.

The range setting unit 12 sets the adjustment range based on the operation position data input from the determination unit 11. There are various ways for this setting.

[First Technique]

The range setting unit 12 may set the adjustment range whose boundaries are at least two operation positions located outermost among a plurality of operation positions. This technique is based on the assumption that a user is trying to find a desired value in the operation range including all of the plurality of operation positions.

Figure 6:
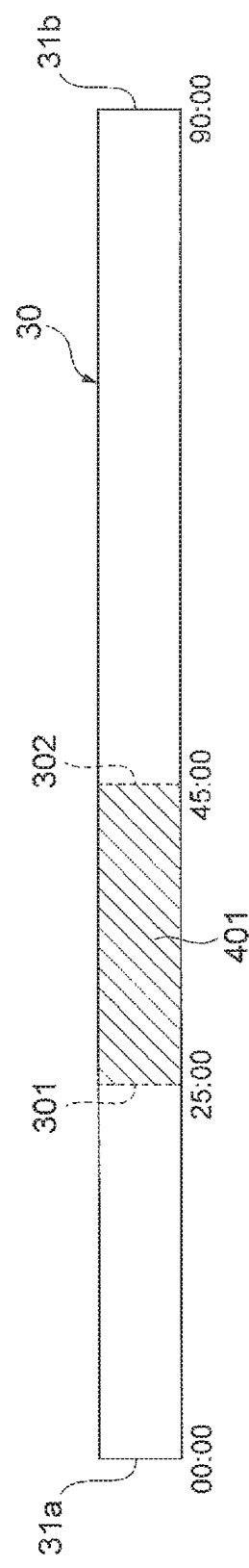
FIG. 6 is a view showing setting of an adjustment range.

An example where the first technique is applied to the seekbar 30 is described with reference to FIG. 6. It is assumed that the outermost operation positions are a position 301 corresponding to the playback start time "25:00" and a position 302 corresponding to the playback start time "45:00". In this case, the range setting unit 12 sets a range 401 between those positions 301 and 302 as the adjustment range.

[Second Technique]

In the case where the operation position data indicates a first operation position and a second operation position that is specified after the first operation position, the range setting unit 12 may set the adjustment range whose boundaries are the first operation position and the end of the slidable range and which includes the second operation position. This technique is based on the assumption that, if a user specifies the second operation position after specifying the first operation position, the user is trying to find a value in the range that at least includes the second operation position.

Figure 7:
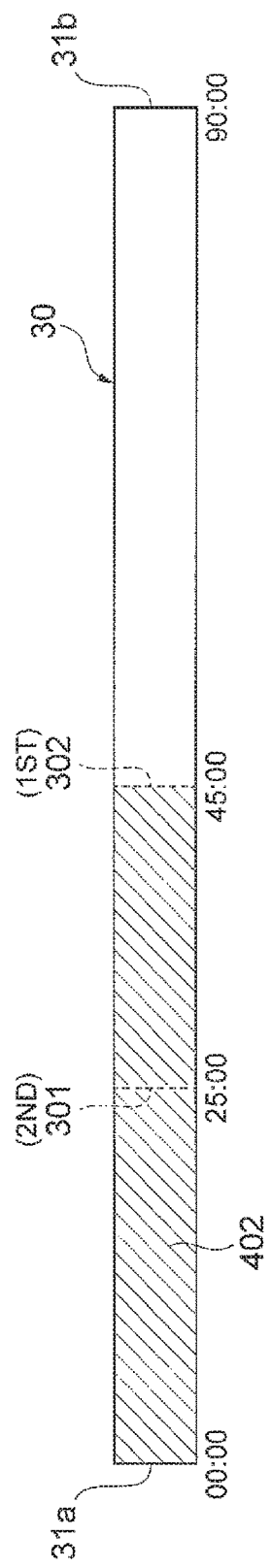
FIG. 7 is a view showing setting of an adjustment range.

An example where the second technique is applied to the seekbar 30 is described with reference to FIG. 7. In this example, the first operation position is the position 302 corresponding to the playback start time "45:00", and the second operation position is the position 301 corresponding to the playback start time "25:00". In this case, the range setting unit 12 sets a range 402 ranging from the end 31a of the slidable range to the first operation position 302 as the adjustment range. This adjustment range 402 includes the second operation position 301. Note that the orders "1st" and "2nd" shown in FIG. 7 are values indicating which of the two positions 301 and 302 has been specified earlier in a relative way, and it is not necessarily the absolute value of the specified order.

Figure 8:
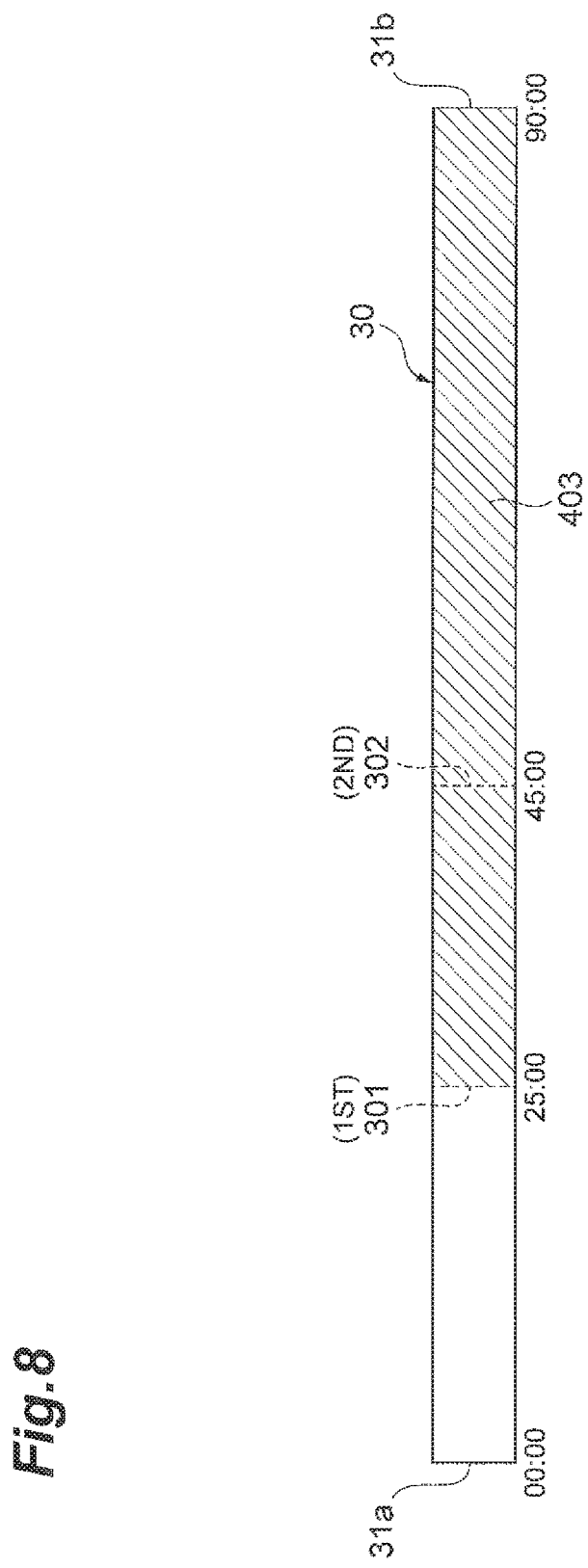
FIG. 8 is a view showing setting of an adjustment range.

Another example where the second technique is applied to the seekbar 30 is described with reference to FIG. 8. In this example, the first operation position is the position 301 corresponding to the playback start time "25:00", and the second operation position is the position 302 corresponding to the playback start time "45:00". In this case, the range setting unit 12 sets a range 403 ranging from the first operation position 301 to the end 31b of the slidable range as the adjustment range. This adjustment range 403 includes the second operation position 302. Note that the orders "1st" and "2nd" shown in FIG. 8 are also relative values just like those of FIG. 7.

[Third Technique]

In the case where the first operation position, the second operation position and the third operation position are specified in this order, and the third operation position is located between the first operation position and the second operation position, the range setting unit 12 may set the adjustment range whose boundaries are the first operation position and the second operation position. This technique is based on the assumption that, if a user specifies another position between the first operation position and the second operation position, the user is trying to find a desired value between the first operation position and the second operation position.

Figure 9:
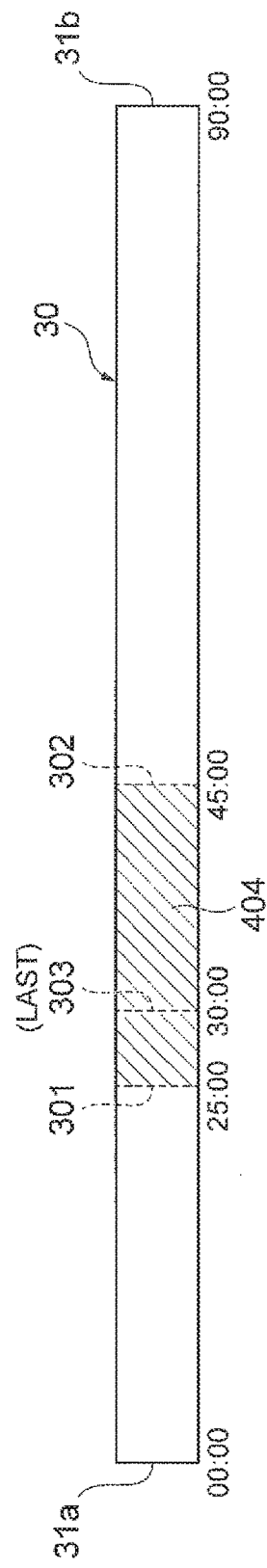
FIG. 9 is a view showing setting of an adjustment range.

An example where the third technique is applied to the seekbar 30 is described with reference to FIG. 9. In this example, the first operation position is the position 301 corresponding to the playback start time "25:00", the second operation position is the position 302 corresponding to the playback start time "45:00", and the third operation position is the position 303 corresponding to the playback start time "30:00". In this case, the range setting unit 12 sets a range 404 ranging from the first operation position 301 to the second operation position 302 as the adjustment range. This adjustment range 404 is the same as the range 401 in FIG. 6 as a result. In the case where the first operation position is the position 302, the second operation position is the position 301, and the third operation position is the position 303 also, the range setting unit 12 sets the range 404 as the adjustment range.

Although there are various ways of setting the adjustment range as described above, the range setting unit 12 outputs data indicating the set adjustment range to the sliding control unit 13 in any way.

The sliding control unit 13 is a functional element that controls a sliding operation in the adjustment range, and it includes a setting unit 13a and a cancellation unit 13b. When the adjustment range is set, the setting unit 13a controls a sliding operation so that the pace of change in value in that adjustment range is slower than the pace of change in value in the no adjustment range. After that, when canceling the adjustment range and restoring the control of a sliding operation, the cancellation unit 13b sets the pace of change in value to the normal value all over the slidable range.

The functions of the setting unit 13a are described first. The setting unit 13a controls a sliding operation by using any of the following two techniques, for example.

[First Technique]

The setting unit 13a may reduce the moving speed (the speed of sliding) of a knob in the adjustment range and thereby sets the pace of change in value in the adjustment range to be lower than the normal value. In this case, even when a user intends to move the knob in the adjustment range in the same way as in the no adjustment range, the moving speed of the knob is low in the adjustment range, and therefore the moving distance of the knob per unit time is short. Therefore, the pace of change in value in the slidable range in the GUI is lower in the adjustment range than in the normal case (no adjustment range).

Figure 10:
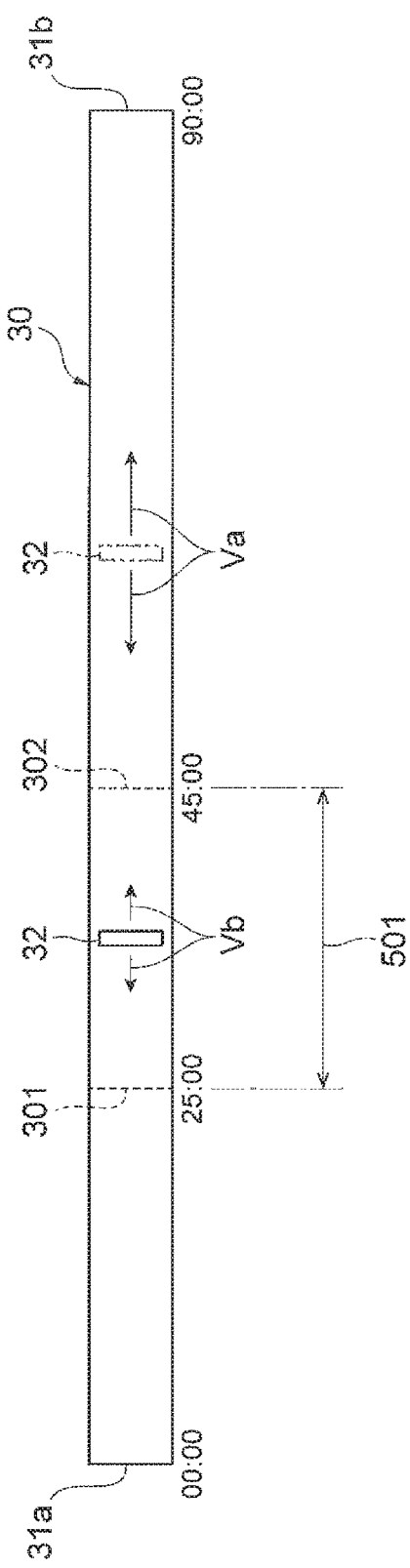
FIG. 10 is a view showing control of a sliding operation.

The processing of reducing the speed of sliding in the seekbar 30 is described with reference to FIG. 10. In this example, an adjustment range 501 ranges from the position 301 to the position 302, and no adjustment ranges are the range from the end 31a to the position 301 and the range from the position 302 to the end 31b. When the knob 32 is in the no adjustment range, the setting unit 13a maintains the speed of the knob 32 at a normal value Va. In this case, because the moving distance of the knob 32 per unit time is long, when viewed from a user, the playback start time changes largely like "60:00->61:00->62:00->63:00->. . . " or "60:00->59:00->58:00->57:00->. . . ", for example. On the other hand, when the knob 32 is within the adjustment range 501, the setting unit 13a sets the speed of the knob to Vb (where Vb<Va). In this case, because the moving distance of the knob per unit time is shorter than the normal, when viewed from a user, the playback start time appears to change little by little like "35:00->35:10->35:20->35:30->. . . " or "35:00->34:50->34:40->34:30->. . . ", for example. Stated differently, it appears to the user that the knob becomes slow to react in the adjustment range. Note that the range of change in the playback start time when viewed from a user is not limited to the above. For example, the playback start time may appear to change every one second in the adjustment range.

[Second Technique]

The setting unit 13a may set the pace of change in value in the adjustment range to be lower than the normal value by displaying the adjustment range in a large scale along the sliding direction of a knob. In this case, the moving speed of the knob is the same between the adjustment range and the no adjustment range. However, because the length of the adjustment range along the sliding direction becomes longer, the moving direction of the knob that is necessary for changing a value by a specific amount becomes longer in the adjustment range than in the no adjustment range. Therefore, the pace of change in value that is associated with the axis indicating the moving direction of the knob is lower in the adjustment range than in the normal case.

The processing of enlarging the adjustment range along the sliding direction is described hereinafter with reference to FIG. 11. In the example of the upper part of FIG. 11, the adjustment range is a range 502 where the playback start time is from 25:00 to 45:00, and both of the ends of the adjustment range 502 are different from the ends 31a and 31b of the slidable range. In the example of the middle part of FIG. 11, the adjustment range is a range 503 where the playback start time is from 00:00 to 45:00, and therefore the start point is the same but the end point is different between the adjustment range 503 and the slidable range. In the example of the lower part of FIG. 11, the adjustment range is a range 504 where the playback start time is from 25:00 to 90:00, and therefore the start point is different but the end point is the same between the adjustment range 504 and the slidable range. In any of the examples shown in FIG. 11, the moving distance of the knob that is necessary for changing a value by a specific amount is longer in the enlarged adjustment range. Therefore, for a user, while the playback start time changes largely like "35:00->36:00->37:00->38:00->. . . " or "35:00->34:00->33:00->32:00->. . . " with the movement of the knob before the setting of the adjustment range, it changes little by little like "35:00->35:10->35:20->35:30->. . . " or "35:00->34:50->34:40->34:30->. . . " after the setting of the adjustment range. Note that the range of change in the playback start time when viewed from a user is not limited to the above. For example, the playback start time may appear to change every one second in the adjustment range.

Figure 11:
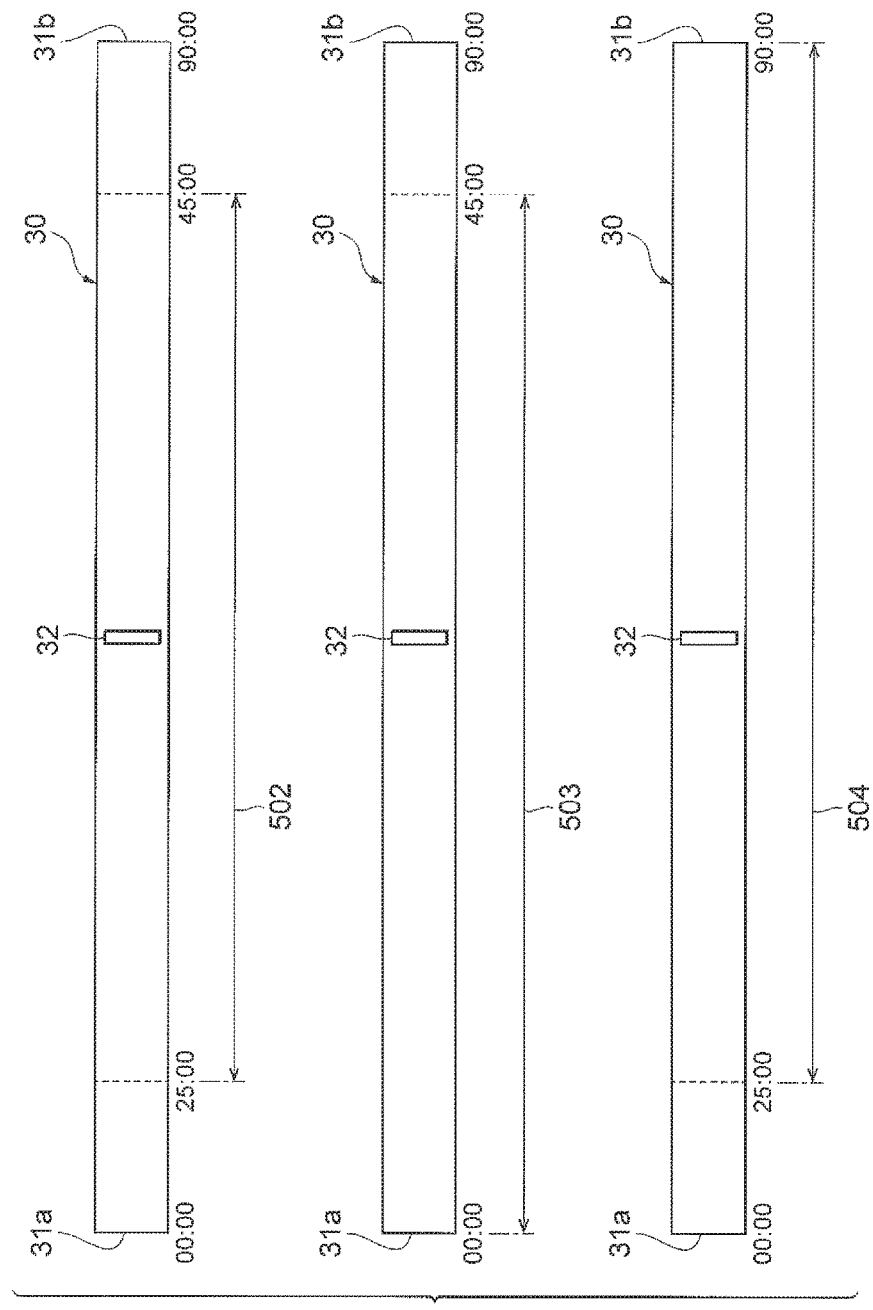
FIG. 11 is a view showing control of a sliding operation.
Figure 12:
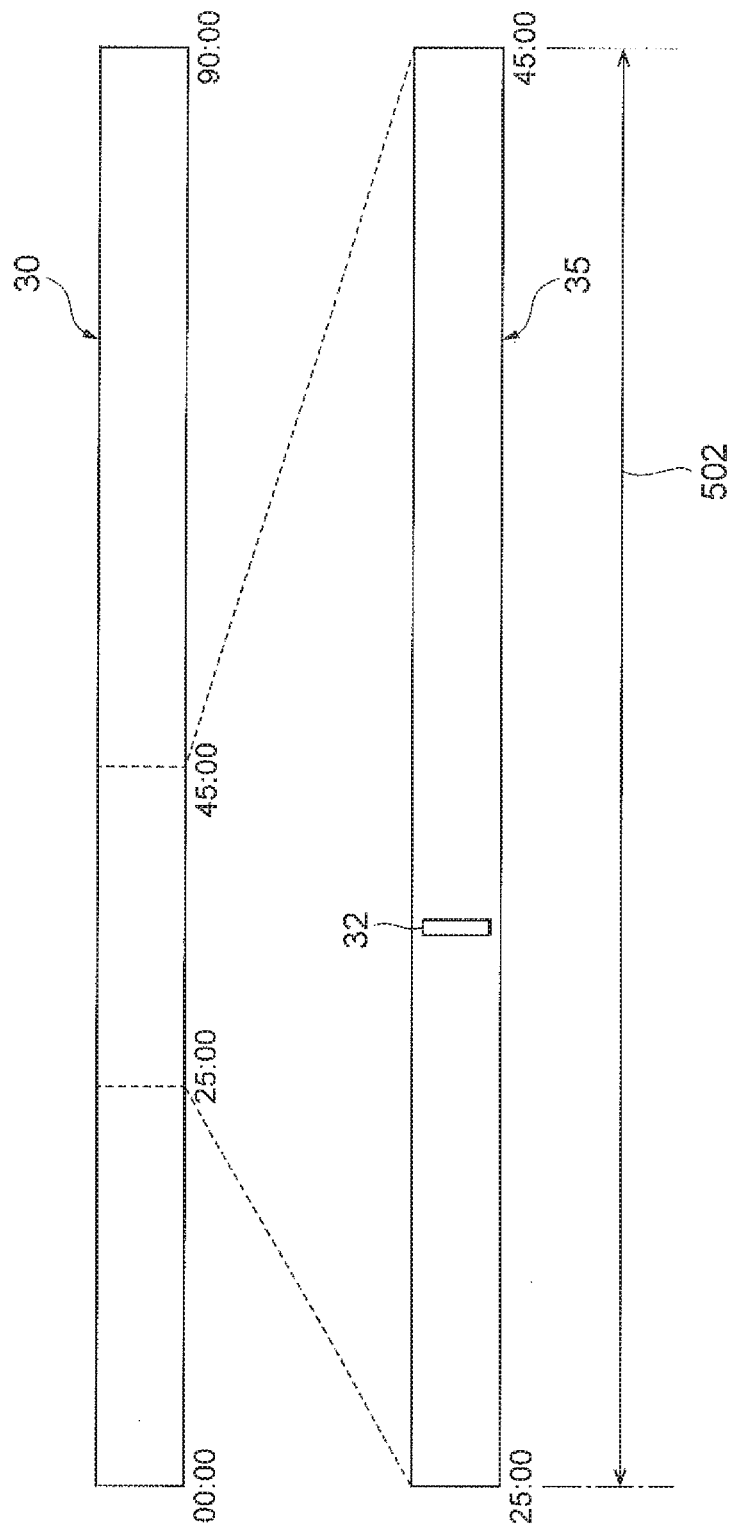
FIG. 12 is a view showing control of a sliding operation.

Although the enlarged adjustment range is plotted inside the original seekbar 30 in the example of FIG. 11, the method of plotting the enlarged adjustment range is not limited thereto. For example, the setting unit 13a may plot the enlarged adjustment range outside the original seekbar 30. FIG. 12 shows an example in which the adjustment range 502 shown in the upper part of FIG. 11 is plotted outside the seekbar 30. In this example, the width of a new seekbar 35 indicating the adjustment range 502 is set to be the same width as the original seekbar 30.

[Third Technique]

Alternatively, the setting unit 13a may directly change the pace of change in value in the adjustment range so that it is lower than the pace of change in value in the no adjustment range. For example, the setting unit 13a may change the playback start time every Ta seconds in the no adjustment range and change the playback start time every Tb seconds (where Tb<Ta) in the adjustment range when a user presses a fast-forward button or a fast-rewind button in the seekbar.

The processing of cancelling special control in the adjustment range and setting the control of a sliding operation back to the normal is described hereinafter. When the setting unit 13a starts the control of reducing the pace of change in value in the adjustment range, the cancellation unit 13b starts to wait for the occurrence of an event for canceling the control. The event is a signal that is generated after the setting unit 13a starts controlling the sliding operation in the adjustment range. The cancellation unit 13b acquires this event.

For example, the cancellation unit 13b may acquire the event indicating that the knob has moved from the adjustment range to the no adjustment range (which is, the event indicating that the knob has gone out of the adjustment range). Alternatively, the cancellation unit 13b may acquire the event indicating that a specified time has elapsed from the setting of the adjustment range. An example of this event is the event indicating that a video has been played back for a specified time from an arbitrary playback start time in the adjustment range of the seekbar 30. Alternatively, the cancellation unit 13b may acquire the event indicating that one operation (for example, one click operation or drag operation) of the knob by a user has ended after the setting of the adjustment range. Examples of this event are the event indicating that a specific RGB value is selected in the adjustment range of the color picker and the event indicating that a specific playback start time is selected in the adjustment range of the seekbar 30.

The type of the event acquired by the cancellation unit 13*b* is not limited. In any way, when the cancellation unit 13*b* acquires the event, it sets the pace of change in value back to the normal value in the entire slidable range of the GUI. In the case where the setting unit 13*a* adjusts the sliding operation by the first technique, the cancellation unit 13*b* cancels the adjustment range and sets the moving speed of the knob to the normal value in the entire slidable range and thereby sets the GUI to the original state. In the case where the setting unit 13*a* adjusts the sliding operation by the second technique, the cancellation unit 13*b* cancels the adjustment range and ends the enlarged display of the range and thereby sets the GUI to the original state. In the case where the setting unit 13*a* adjusts the sliding operation by the third technique, the cancellation unit 13*b* cancels the adjustment range and sets the pace of change in value to the normal value in the entire slidable range of the GUI and thereby sets the GUI to the original state.

Figure 13:
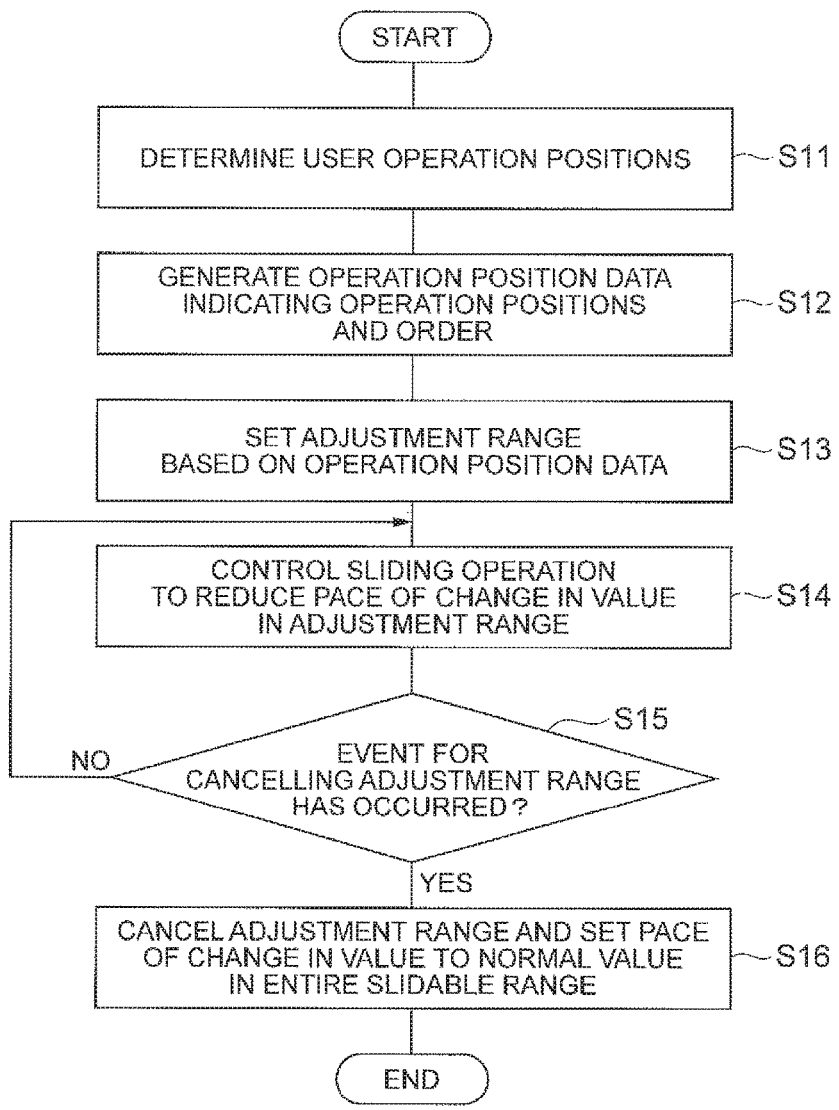
FIG. 13 is a flowchart showing an operation of the information processing device according to the embodiment.

Hereinafter, the operation of the information processing device and an information processing method (a method of controlling a sliding operation) according to this embodiment are described with reference to FIG. 13.

First, the determination unit 11 determines operation positions of a user in GUI (Step S11, determination step). The determination unit 11 acquires data such as an event or a parameter related to the operation of a knob from the GUI and determines the operation positions based on the data. As described earlier, the determination unit 11 can determine the operation positions from only one operation or from a plurality of operations. Next, the determination unit 11 generates operation position data indicating one or more operation positions and the order of the positions (S12).

Then, the range setting unit 12 sets the adjustment range based on the operation position data (Step S13, setting step). The range setting unit 12 sets the adjustment range by using any of the above-described first to third techniques, for example.

After that, in the sliding control unit 13, the setting unit 13*a* controls the sliding operation so as to reduce the pace of change in value in the adjustment range (Step S14, sliding control step). After that, the setting unit 13*a* continues that control until the occurrence of an event for cancelling the adjustment range (No in Step S15). When an event for cancelling the adjustment range occurs (Yes in Step S15), the cancellation unit 13*b* cancels the adjustment range in response to the event and sets the pace of change in value back to the normal value in the entire slidable range (Step S16). The sliding control of the GUI thereby returns to the initial state.

Figure 14:
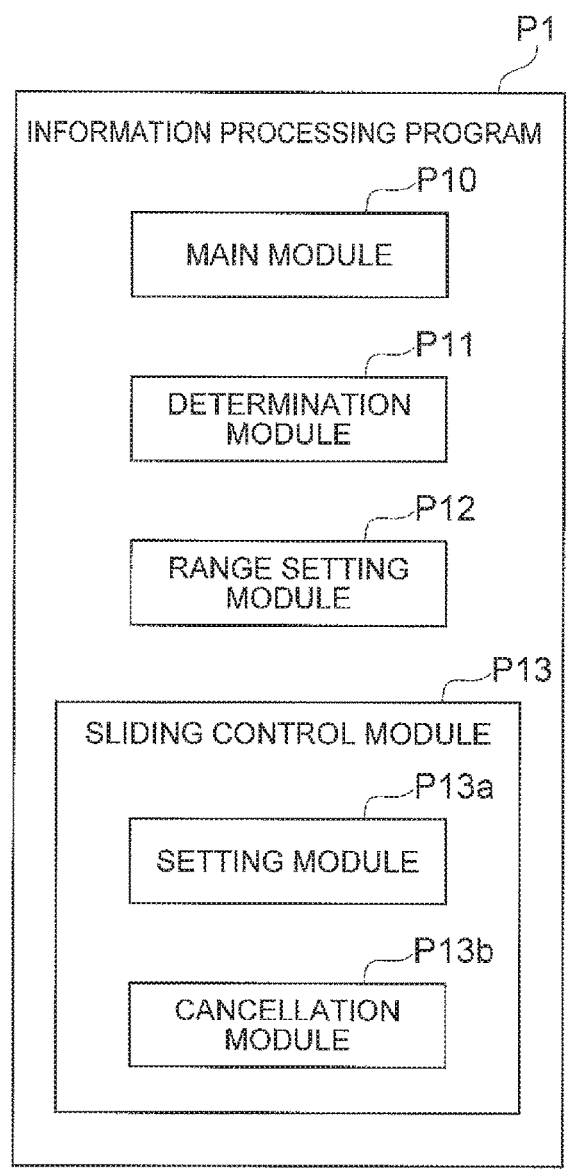
FIG. 14 is a view showing a configuration of an information processing program according to the embodiment.

An information processing program P1 for implementing the information processing device 10 is described hereinafter with reference to FIG. 14. The information processing program P1 includes a main module P10, a determination module P11, a range setting module P12, and a sliding control module P13. The sliding control module P13 includes a setting module P13*a* and a cancellation module P13*b*.

The main module P10 is a part that exercises control over the GUI. The functions implemented by executing the determination module P11, the range setting module P12, and the sliding control module P13 are equal to the functions of the determination unit 11, the range setting unit 12 and the sliding control unit 13 described above, respectively. The functions implemented by executing the setting module P13*a* and the cancellation module P13*b* are equal to the functions of the setting unit 13*a* and the cancellation unit 13*b*, respectively.

The information processing program P1 is provided in the form of being recorded in a static manner on a tangible recording medium such as CD-ROM or DVD-ROM or semiconductor memory, for example. Further, the information processing program P1 may be provided as a data signal superimposed onto a carrier wave through a communication network.

As described above, according to this embodiment, the pace of change in value in the adjustment range that is set based on operation positions in GUI is set to be lower than the pace of change in value in the no adjustment range. Specifically, the amount of change in value per unit time when the knob is slid in the adjustment range is set to be smaller than the amount of change in value per unit time when the knob is slid in the no adjustment range. By controlling the operation of the knob for which a user operation is done in this manner, the value changes more slowly than the normal case in the adjustment range. By such control of GUI, a user can easily find a desired value in the adjustment range.

In this embodiment, a plurality of operation positions are determined, and the adjustment range is set based at least on the first operation position and the second operation position that is specified after the first operation position. By obtaining a plurality of operation positions in this manner, it is possible to determine the operation range where a user is likely to try to find a desired value and set the adjustment range corresponding to the operation range. As a result, it is possible to set the region where the pace of change in value is reduced in accordance with the user's intention.

For example, by setting the adjustment range whose boundaries are the first operation position and the end of the slidable range and which includes the second operation position, it is possible to reduce the pace of change in value over a wide range. Further, by setting the adjustment range whose boundaries are the first operation position and the second operation position, it is possible to reduce the pace of change in value within the range of user operations.

Alternatively, the adjustment range may be set by using the third operation position in addition to the first operation position and the second operation position. In the case where the third operation position is specified between the first operation position and the second operation position, it is highly likely that a user is trying to find a desired value between the first operation position and the second operation position. Based on this assumption, by taking the third operation position into consideration, it is possible to set the region where the pace of change in value is reduced in accordance with the user's intention.

Alternatively, the adjustment range whose boundaries are at least two operation positions located outermost among a plurality of operation positions may be set. In this case, it is possible to reliably define the range where a user is likely to try to find a desired value and reduce the pace of change in value within that range.

In this embodiment, by setting the moving speed of a knob in the adjustment range to be lower than the moving speed of the knob in the no adjustment range, the user-friendliness of the knob when a user tries to find a desired value is improved. Alternatively, in the case of displaying the adjustment range in an enlarged scale along the sliding direction of a knob as well, the user-friendliness of the knob is improved just like the case of controlling the moving speed of the knob.

In this embodiment, by setting the pace of change in value in the adjustment range to be the same as the pace of change in value in the no adjustment range in accordance with a specified event, it is possible to set the control of the sliding operation of the GUI back to the initial state.

An embodiment of the present invention is described in detail above. However, the present invention is not limited to the above-described embodiment. Various changes and modifications may be made to the present invention without departing from the scope of the invention.

In GUI where a value and the corresponding position of a knob can automatically move forward with the lapse of time, the information processing device 10 may set the adjustment range by taking the lapse of time into consideration as well. An example of such GUI is the seekbar 30 where the knob 32 automatically moves forward with the lapse of playback time during the playback of a video. This alternative example is described hereinbelow.

Figure 15:
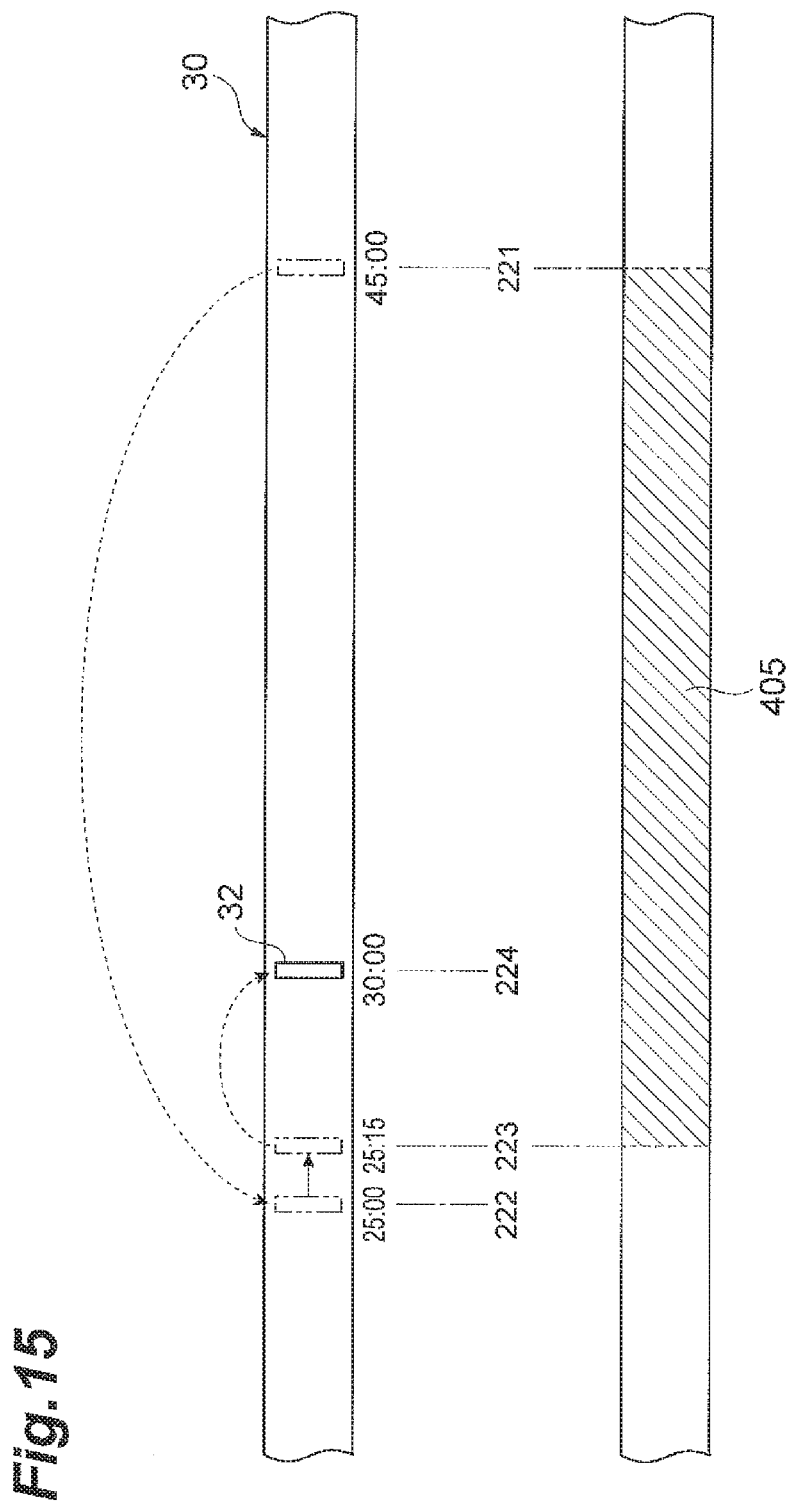
FIG. 15 is a view showing setting of an adjustment range according to an alternative example.

FIG. 15 shows an example where a position 221 is specified first, a position 222, which is earlier than the position 221, is specified next, the knob 32 automatically moves forward from the position 222 to a position 223, and finally a position 224 located between the position 223 and the position 221 is specified. Thus, the knob 32 moves from the position 221 to the position 222 instantaneously, moves from the position 222 to the position 223 with the lapse of time (playback of a video), and further moves from the position 223 to the position 224 instantaneously. In this example, the positions 221, 222 and 224 correspond to the first operation position, the second operation position and the third operation position, respectively.

in this manner, in the case where the knob moves automatically between the first operation position and the second operation position, and further a new operation position (third operation position) is specified between the position of the knob after movement and the first operation position, the range setting unit 12 may set a region between the position of the knob after movement and the first operation position as the adjustment range. In the example of FIG. 15, the range setting unit 12 sets a range 405 ranging from the position 223 after the automatic movement of the knob 32 to the first operation position 221 as the adjustment range. Thus, the positions 223 and 221 are the boundaries of the adjustment range 405. This processing means that the information processing device 10 estimates that the range of time "from 25:00 to 25:15" is not a user's desired range. In this manner, by excluding the range where the knob has automatically moved from the range between the first operation position and the second operation position, it is possible to narrow down the region where a user is likely to try to find a desired value. The processing that is performed by the sliding control unit 13 after the adjustment range is set is the same as that of the above-described embodiment.

As described above, the present invention is applicable also to GUI (for example, color picker) where the slidable range is two-dimensional. The control of a sliding operation in a color picker 40 where a knob 41 can be moved on the xy plane is described hereinafter with reference to FIGS. 16 to 18.

Figure 16:
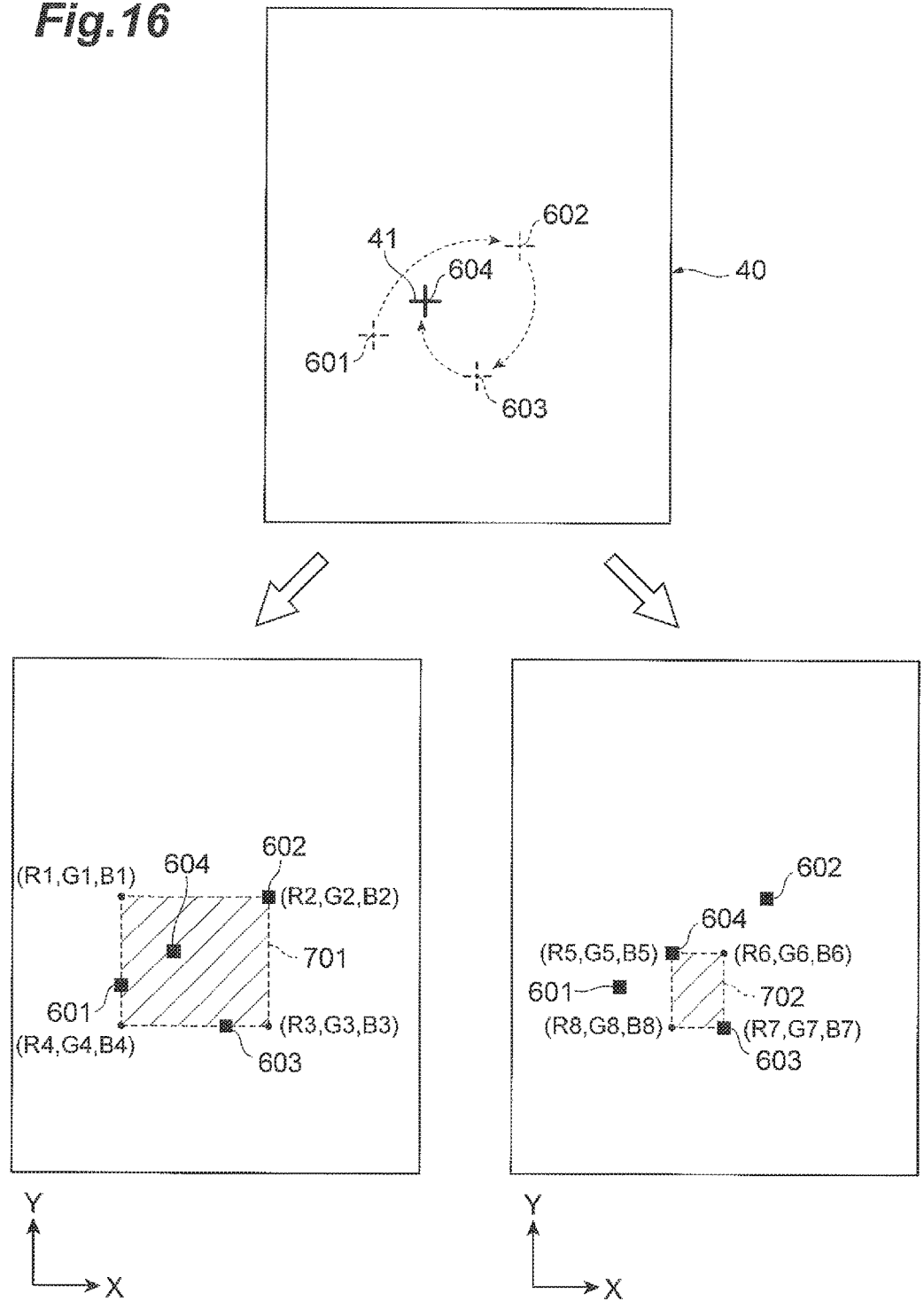
FIG. 16 is a view showing setting of an adjustment range according to an alternative example.

When it is assumed that a user moves the knob 41 in the sequence of positions 601, 602, 603 and 604 as shown in FIG. 16, the determination unit 11 first determines that those four positions are operation positions and generates operation position data indicating those positions.

Then, the range setting unit 112 sets the adjustment range based on the operation position data. For example, the range setting unit 12 may set a rectangle 701 that is defined using a combination of the maximum value and the minimum value of the x-coordinates of the plurality of operation positions 601 to 604 and the maximum value and. the minimum value of the y-coordinates of the plurality of operation positions 601 to 604 as the adjustment range. Alternatively, the range setting unit 12 may set a rectangle 702 whose vertices are an operation position 604 that has been specified last (which corresponds to the second operation position) and an operation position 603 that has been specified second to last (which corresponds to the first operation position) as the adjustment range. Note that, in the figure, the four vertices of the rectangle 701 are represented as (R1,G1,B1), (R2,G2,B2), (R3,G3,B3) and (R4,G4,B4), and the four vertices of the rectangle 702 are represented as (R5,G5,B5), (R6,G6,B6), (R7,G7,B7) and (R8,G8,B8) for the sake of convenience.

Figure 17:
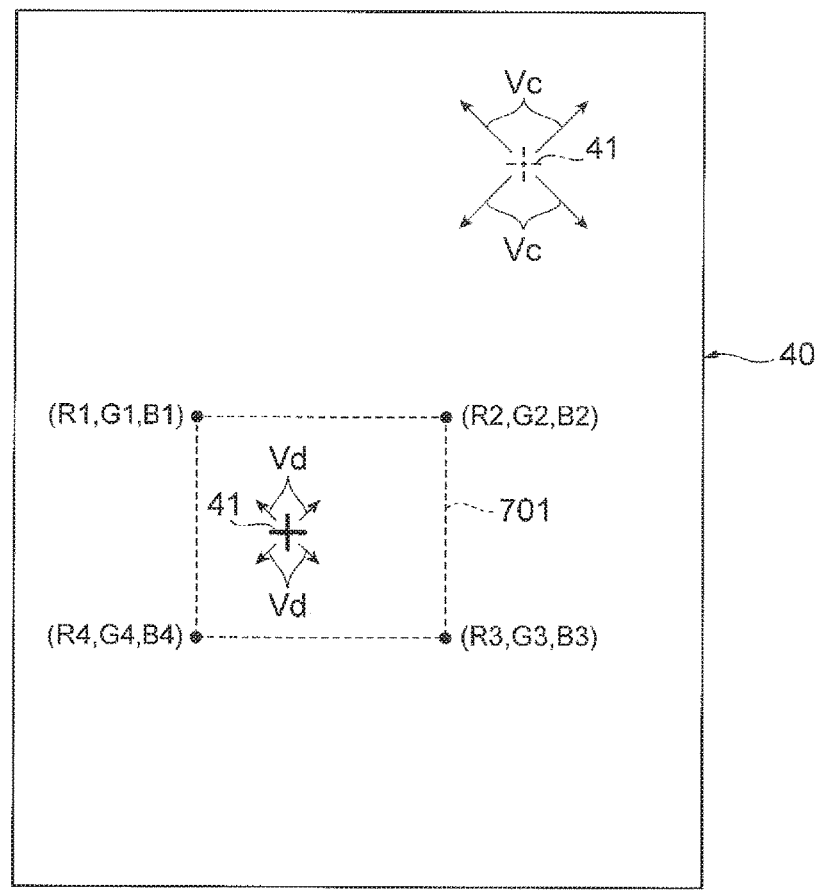
FIG. 17 is a view showing control of a sliding operation according to an alternative example.
Figure 18:
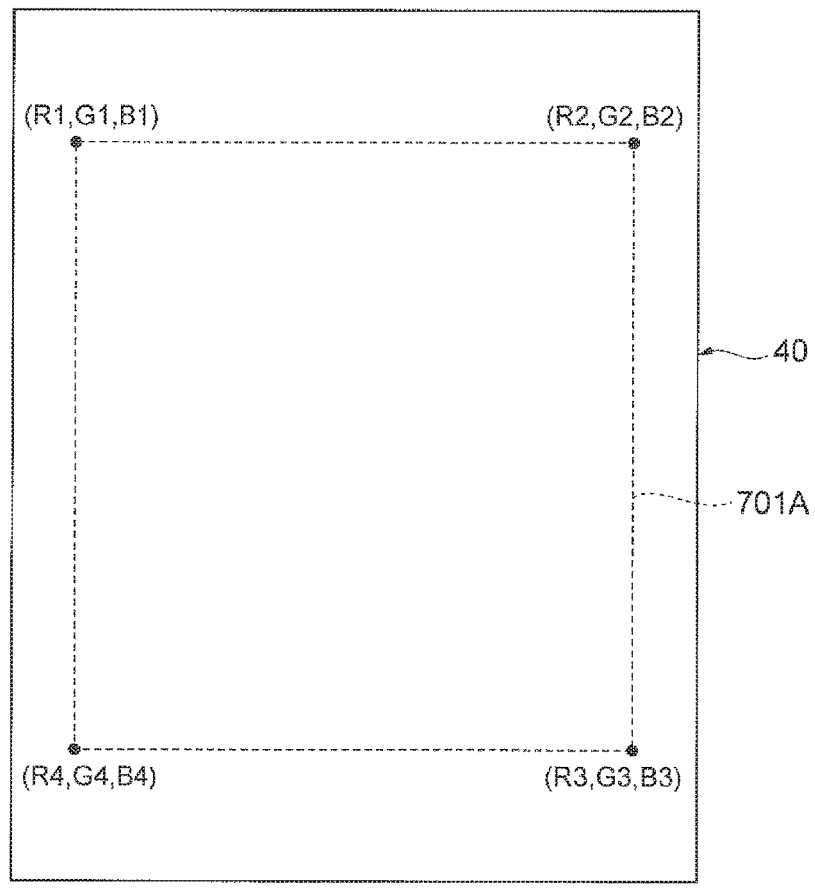
FIG. 18 is a view showing control of a sliding operation according to an alternative example.

After the adjustment range is set, the setting unit 13a of the sliding control unit 13 controls a sliding operation in the adjustment range. As shown in FIG. 17, the setting unit 13a may set the moving speed Vd of the knob 41 in the adjustment range 701 to be lower than the moving speed Vc in the no adjustment range (which is the region other than the adjustment range 701 in the color picker 40). Alternatively, as shown in FIG. 18, the setting unit 13a may display a range 701A, which is the enlarged version of the adjustment range 701, in the color picker 40. As a matter of course, the setting unit 13a may display the enlarged adjustment range 701A as a different window from the original window of the color picker 40.

The operation of the cancellation unit 13b is the same as that of the above-described embodiment. Specifically, the cancellation unit 13b may acquire the event indicating that the knob has moved from the adjustment range to the no adjustment range. Alternatively, the cancellation unit 13b may acquire the event indicating that one operation (for example, one click operation or drag operation) of the knob by a user has ended after the setting of the adjustment range. Alternatively, the cancellation unit 13b may acquire the event indicating that a specified time has elapsed from the setting of the adjustment range.

The information processing device may include only some of the determination unit, the range setting unit and the sliding control unit, and other one or more computers may include the other functional elements. In this case, the information processing device and the other computer transmits necessary data to each other through a network, and thereby the same process as in the above-described embodiment is performed. For example, the information processing device may include the range setting unit and the sliding control unit only, and another computer may include the determination, unit.

REFERENCE SIGNS LIST

10 . . . information processing device, 11 . . . determination unit, 12 . . . range setting unit, 13 . . . sliding control unit, 13a . . . setting unit, 13b . . . cancellation unit, P1 . . . information processing program, P10 . . . main module, P11 . . . determination module, P12 . . . range setting unit module, P13 . . . sliding control module, P13a . . . setting module, P13b . . . cancellation module

The invention claimed is:

1. A computer architecture comprising:
a display;
at least one memory configured to store computer program code;

at least one processor configured to access said at least one memory and operate according as instructed by said computer program code, said computer program code including:

setting code configured to cause at least one of said at least one processor to, based on user operation positions in a graphical user interface that outputs information on a basis of a value specified by a user operation, automatically set an adjustment range being a part of a slidable range in the graphical user interface; and control code configured to cause at least one of said at least one processor to:

set a moving speed of a knob by a user operation in the adjustment range to be lower than a moving speed of the knob by the user operation in a no adjustment range different from the adjustment range, and display the entire slidable range on said display, and thereby control the graphical user interface so that a pace of change in the value in the adjustment range is lower than a pace of change in the value in the no adjustment range.

2. The computer architecture according to claim 1, wherein
the setting code is configured to cause at least one of said at least one processor to set the adjustment range based on a first operation position and a second operation position specified after the first operation position among a plurality of operation positions.

3. The computer architecture according to claim 2, wherein
the setting code is configured to cause at least one of said at least one processor to set the adjustment range whose boundaries are the first operation position and an end of the slidable range and including the second operation position.

4. The computer architecture according to claim 2, wherein
the setting code configured to cause at least one of said at least one processor to set the adjustment range whose boundaries are the first operation position and the second operation position.

5. The computer architecture according to claim 4, wherein
when, after the second operation position, a third operation position is specified in a region between the first operation position and the second operation position, the setting code causes at least one of said at least one processor to set the adjustment range whose boundaries are the first operation position and the second operation position.

6. The computer architecture according to claim 5, wherein
when, after a knob automatically moves from the second operation position to the first operation position, a third operation position is specified in a region between a position of the knob after movement and the first operation position, the setting code causes at least one of said at least one processor to set the adjustment range whose boundaries are the position of the knob after movement and the first operation position.

7. An information processing method performed by at least one computer processor, comprising:

automatically setting, based on user operation positions in a graphical user interface that outputs information on a basis of a value specified by a user operation, an adjustment range being a part of a slidable range in the graphical user interface; and setting a moving speed of a knob by a user operation in the adjustment range to be lower than a moving speed of the knob by the user operation in a no adjustment range different from the adjustment range while displaying the entire slidable range, and thereby controlling the graphical user interface so that a pace of change in the value in the adjustment range is lower than a pace of change in the value in the no adjustment range.

8. A computer architecture comprising:
a display;
at least one memory configured to store computer program code;
at least one processor configured to access said at least one memory and operate according as instructed by said computer program code, said computer program code including:

setting code configured to cause at least one of said at least one processor to, based on user operation positions in a graphical user interface that outputs information on a basis of a value specified by a user operation, automatically set an adjustment range being a part of a slidable range in the graphical user interface; and control code configured to cause at least one of said at least one processor to:

display the adjustment range on said display in a part of a display region of the slidable range while displaying the entire slidable range, and control the graphical user interface so that a pace of change in the value in the adjustment range is lower than a pace of change in the value in a no adjustment range different from the adjustment range, wherein based on a first operation position and a second operation position specified after the first operation position among a plurality of operation positions, when, after a knob automatically moves from the second operation position to the first operation position, a third operation position is specified in a region between a position of the knob after movement and the first operation position, the setting code causes at least one of said at least one processor to set the adjustment range whose boundaries are the position of the knob after movement and the first operation position.

9. A computer architecture comprising:
a display;
at least one memory configured to store computer program code;
at least one processor configured to access said at least one memory and operate according as instructed by said computer program code, said computer program code including:

setting code configured to cause at least one of said at least one processor to, based on user operation positions in a graphical user interface that outputs information on a basis of a value specified by a user operation, automatically set an adjustment range being a part of a slidable range in the graphical user interface; and control code configured to cause at least one of said at least one processor to display the adjustment range on said display in a part of a display region of the slidable range while displaying the entire slidable range, and control the graphical user interface so that a pace of change in the value in the adjustment range is lower than a pace of change in the value in a no adjustment range different from the adjustment range, wherein based on a first operation position and a second operation position specified after the first operation position among a plurality of operation positions, when, after the second operation position, a third operation position is specified in a region between the first operation position and the second operation position, the setting code causes at least one of said at least one processor to set the adjustment range whose boundaries are the first operation position and the second operation position.

\* \* \* \* \*